US011518468B2

(12) United States Patent
Anspach

(10) Patent No.: US 11,518,468 B2
(45) Date of Patent: Dec. 6, 2022

(54) SEAT DROPPER REMOTE DEVICE

(71) Applicant: SDG Components Inc., Huntington Beach, CA (US)

(72) Inventor: Tyler Anspach, Huntington Beach, CA (US)

(73) Assignee: SDG Components Inc., Huntington Beach, CA (US)

( * ) Notice: Subject to any disclaimer, the term of this patent is extended or adjusted under 35 U.S.C. 154(b) by 453 days.

(21) Appl. No.: 16/786,179

(22) Filed: Feb. 10, 2020

(65) Prior Publication Data

US 2021/0245831 A1  Aug. 12, 2021

(51) Int. Cl.
| | |
|---|---|
| *B62K 23/06* | (2006.01) |
| *G05G 1/01* | (2008.04) |
| *G05G 1/04* | (2006.01) |
| *B62J 1/08* | (2006.01) |
| *B62K 19/36* | (2006.01) |
| *F16C 1/12* | (2006.01) |

(52) U.S. Cl.
CPC .................. *B62K 23/06* (2013.01); *B62J 1/08* (2013.01); *B62K 19/36* (2013.01); *F16C 1/12* (2013.01); *G05G 1/01* (2013.01); *G05G 1/04* (2013.01); *B62J 2001/085* (2013.01)

(58) Field of Classification Search
CPC ........ B62K 23/06; B62K 19/36; B25M 25/04; G05G 1/01; G05G 1/04; B62J 1/08; B62J 2001/085
See application file for complete search history.

(56) References Cited

U.S. PATENT DOCUMENTS

| | | | | |
|---|---|---|---|---|
| 8,584,550 B1* | 11/2013 | Calendrille, Jr. | ...... | B62K 23/06 |
| | | | | 74/489 |
| 2007/0137385 A1* | 6/2007 | Cesur | .................... | B62K 23/06 |
| | | | | 74/501.6 |
| 2007/0199401 A1* | 8/2007 | Kawakami | ............. | B62K 23/06 |
| | | | | 74/502.2 |
| 2010/0139442 A1* | 6/2010 | Tsu | ........................ | B62M 25/04 |
| | | | | 74/489 |
| 2011/0083525 A1* | 4/2011 | Hirose | .................. | B62M 25/04 |
| | | | | 74/501.6 |

(Continued)

FOREIGN PATENT DOCUMENTS

JP   H1-157091 U  * 10/1989

*Primary Examiner* — Daniel D Yabut
(74) *Attorney, Agent, or Firm* — Shalchi Burch LLP; Ali Shalchi, Esq.

(57) ABSTRACT

A seat dropper remote device has a base portion, central portion and paddle portion. The base portion has a mounting plate for mounting to a bar clamp on a bicycle handlebar and a base bolt hole. The mounting plate has a mounting slot to receive a mounting bolt. The central portion is connected with the base portion, receives an actuation cable, and includes a body having a body bolt hole. The device includes a paddle portion that is connected with the central portion, actuates the actuation cable, and has an assembly bolt cavity and an assembly bolt. The assembly bolt passes through the assembly bolt cavity, body bolt hole, and base bolt hole. The assembly bolt provides rotational adjustment of the paddle portion and the mounting bolt provides lateral adjustment of the paddle portion. The lateral adjustment, rotational adjustment, and actuation of the actuation cable operate independent of one another.

7 Claims, 12 Drawing Sheets

(56) References Cited

U.S. PATENT DOCUMENTS

| | | | |
|---|---|---|---|
| 2014/0026710 A1* | 1/2014 | Takeuchi | F16B 33/00 74/551.8 |
| 2015/0000452 A1* | 1/2015 | Hirotomi | B62K 23/02 74/488 |
| 2015/0000455 A1* | 1/2015 | Hirotomi | B62K 23/06 74/491 |
| 2018/0086412 A1* | 3/2018 | Komatsu | B60T 7/10 |
| 2019/0063489 A1* | 2/2019 | Basiliere | F16C 1/12 |

* cited by examiner

SEAT DROPPER REMOTE DEVICE

FIELD OF THE INVENTION

The present invention is in the field of bicycle components, particularly components for adjusting the height of a bicycle seat.

BACKGROUND

In the performance cycling industry, particularly competition downhill and mountain biking, it is advantageous to be able to re-position the body to suit the riding conditions (e.g. ascending a steep hill, descending a steep hill, or riding on flat terrain) and yield optimal bike control, pedaling power and/or comfort. This can be achieved, for example, by adjusting the height of the seat and thus the rider's center of gravity.

Many existing adjustable-height bicycle seat posts enable a rider to adjust the height of the seat to various positions while riding. The seat posts usually include a telescoping tube structure mounted to the bike frame. The tubes are fixed in a desired position via a hydraulic (e.g. air/oil) or mechanical mechanism (e.g. latch pins through aligned holes in the tubes), and a spring is often employed to exert a restoring force that restores the seat height to a raised position. In a mechanical mechanism, for example, a latch pin may be actuated by deploying an actuator such as a pull knob directly connected to the latch pin, or alternatively, may be a thumb switch/paddle remote device located remotely (e.g. mounted directly to the handlebar or mounted to the brakes thereon) from the latch pin and connected via a flexible motion-transmitting cable (e.g. hydraulic cable). In a hydraulic mechanism, for example, a valve may be opened (via an actuation cable) by pressing a thumb switch/paddle remote device to allow the tubes to move freely, and once the valve is closed (cable released) the air spring can be locked in place via opposing pressures.

The weight of a rider on the seat exerts a shearing force between the telescoping tube structures that is resisted by the latch pin. When the bicycle rider desires to adjust the position of the seat, he or she actuates the mechanism to withdraw the latch pin from the aligned holes in the telescoping tubes and simultaneously lifts his or her body weight off of the seat in order to decrease the shearing force and allow the latch pin to be extracted from the aligned holes.

It is also advantageous for bicycle controls and components to be compact and easy to use. In particular, riders are sensitive to the real estate on the handlebar where it is desirable for components to be un-intrusive and take up as little space as possible for both aesthetic and functional reasons. Riders also appreciate an ergonomic device that is suited to their hand position during riding. Many existing seat adjustment remotes have limited adjustment capabilities and cannot be adequately adjusted to suit rider preferences or anatomy.

Accordingly, there is a need for an improved adjustable bicycle seat remote that is light, compact, ergonomic and compatible with existing bike hardware.

SUMMARY

Described herein are devices, systems, and methods for remotely adjusting the height of a bicycle seat.

An implementation relates to a seat dropper remote device having a base portion, central portion and paddle portion. The base portion has a mounting plate for mounting to a bar clamp on a bicycle handlebar and a base bolt hole. The mounting plate has a mounting slot to receive a mounting bolt. The central portion is connected with the base portion, receives an actuation cable, and includes a body having a body bolt hole. The device includes a paddle portion that is connected with the central portion, actuates the actuation cable, and has an assembly bolt cavity and an assembly bolt. The assembly bolt passes through the assembly bolt cavity, body bolt hole, and base bolt hole. The assembly bolt provides rotational adjustment of the paddle portion and the mounting bolt provides lateral adjustment of the paddle portion. The lateral adjustment, rotational adjustment, and actuation of the actuation cable operate independent of one another.

In one example, the lateral adjustment comprises repositioning the mounting bolt to any point along a length of the mounting slot.

In another example, the rotational adjustment comprises loosening the assembly bolt, rotating the paddle portion to a desired position within a range of paddle rotation, and tightening the assembly bolt.

In another example, the mounting slot has a length of about 10 mm and the base portion can be fixed to the bar clamp at any point along the length of the mounting slot via the lateral adjustment.

In another example, the range of paddle rotation is about 45 degrees.

In another example, the paddle portion receives a cable clamp bolt configured to secure the actuation cable within the paddle portion, the cable clamp bolt positioned adjacent to, and coplanar with, the assembly bolt.

In another example, the mounting bolt is configured to provide lateral adjustment of the paddle portion, the central portion, and the mounting plate relative to the bar clamp.

Another implementation relates to a seat dropper remote device having a base portion, adapter, central portion and paddle portion. The base portion has a mounting plate, an adjustment cavity, and a base bolt hole, the mounting plate having a mounting slot to receive a mounting bolt. The adapter is to receive the mounting bolt, the adapter connected with the mounting plate via the mounting bolt, the adapter configured to connect the base portion to a brake clamp of a brake system. The central portion connected with the base portion, the central portion comprising a body that receives a cable adjuster, the central portion configured to receive an actuation cable. The body includes a body plate, the body plate having a body bolt hole. The paddle portion is connected with the central portion, configured to secure and actuate the actuation cable, and comprising an assembly bolt cavity and an assembly bolt. The assembly bolt passes through the assembly bolt cavity of the paddle portion, the body bolt hole of the central portion, and the base bolt hole of the base portion. The assembly bolt is configured to provide rotational adjustment of the paddle portion relative to the base portion, wherein the mounting bolt is configured to provide lateral adjustment of the paddle portion relative to the adapter, and wherein the lateral adjustment, rotational adjustment, and actuation of the actuation cable operate independent of one another.

In one example, the adapter comprises a proximal attachment plate and a distal coupling plate, the proximal attachment plate receiving the mounting bolt.

In another example, the distal coupling plate is positioned below the proximal attachment plate.

In another example, the lateral adjustment comprises repositioning the mounting bolt to any point along a length of the mounting slot.

In another example, the rotational adjustment comprises loosening the assembly bolt, rotating the paddle portion to a desired position within a range of paddle rotation, and tightening the assembly bolt.

In another example, the mounting slot has a length of about 10 mm and the base portion can be fixed to the bar clamp at any point along the length of the mounting slot via the lateral adjustment.

In another example, the range of paddle rotation is about 45 degrees.

In one example, paddle portion receives a cable clamp bolt configured to secure the actuation cable within the paddle portion, the cable clamp bolt positioned adjacent to, and coplanar with, the assembly bolt.

In another example, the mounting bolt is configured to provide lateral adjustment of the paddle portion, the central portion, and the mounting plate relative to the bar clamp.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In the following discussion, numerous specific details are set forth to provide a thorough understanding of the present invention. However, those skilled in the art will appreciate that the present invention may be practiced without such specific details. In other instances, well-known elements, processes or techniques have been briefly mentioned and not elaborated on in order not to obscure the present invention in unnecessary detail and description. Moreover, specific details and the like may have been omitted inasmuch as such details are not deemed necessary to obtain a complete understanding of the invention, and are considered to be within the understanding of persons having ordinary skill in the relevant art.

Figure 1:
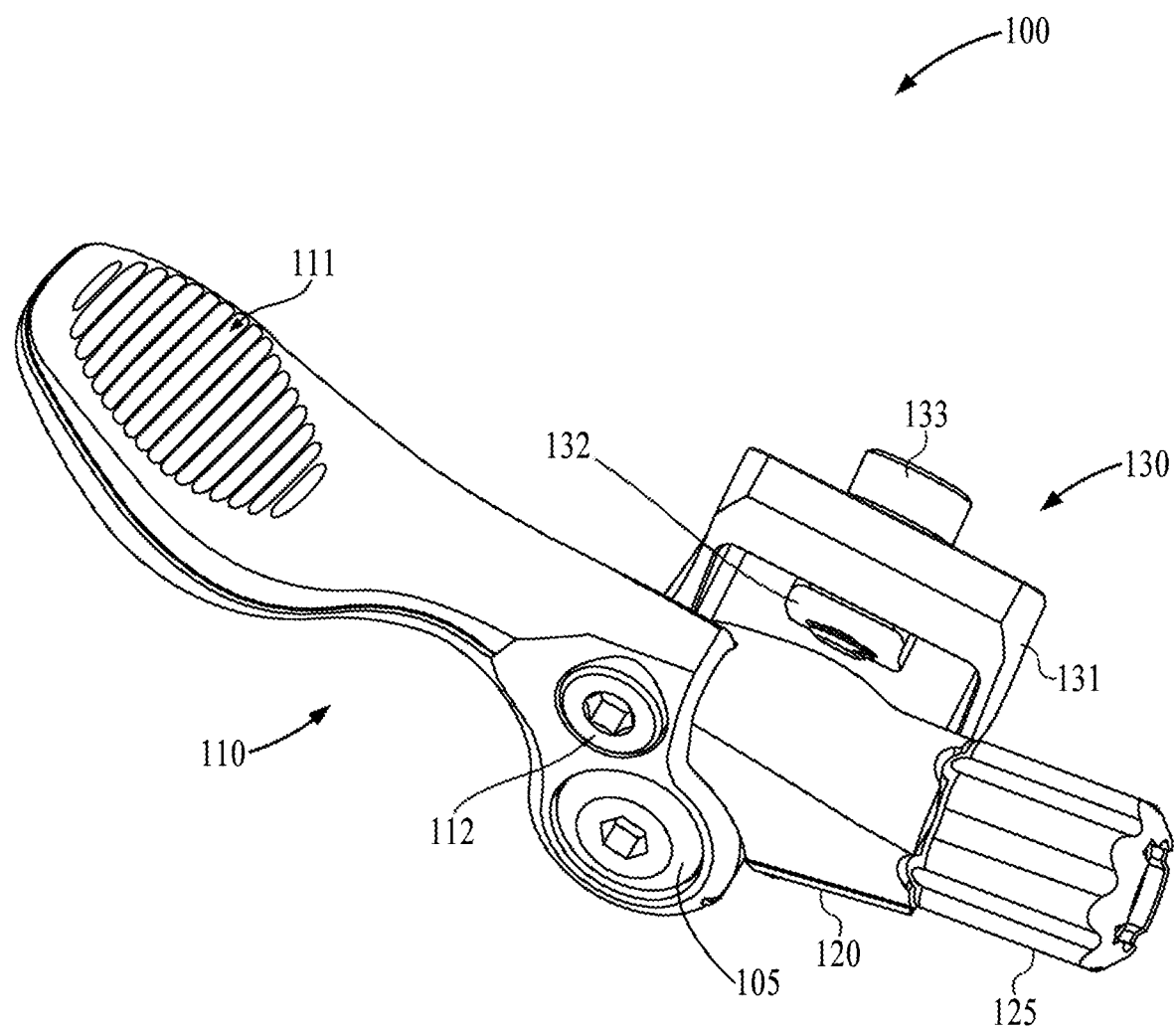
FIG. 1 depicts a perspective view of an exemplary seat dropper remote device in accordance with the present invention.

Referring to FIG. 1 of the drawings, an example of seat dropper remote device 100 is shown in a perspective view in accordance with the present invention. In one example, seat dropper remote device 100 is suitable for structural and operative integration with a standard bicycle (also referred to as "bike" herein) that utilizes a remotely actuated system of component adjustment, a preferred feature being optimal integration with an adjustable height seat post. Typically, with regard to structural integration, a plurality of specialized clamps and optional adapters are provided to connect device 100 onto the handlebar of the bike (see FIGS. 7-10, and FIG. 12). In the following discussion, unless otherwise noted, references to directional movement and spatial orientation (such as up/down, above/below, top/bottom, front/back, left/right) apply to a device 100 oriented for bike installation, and are not necessarily relative to the particular orientations shown in the accompanying drawings. Discussions hereafter will reference a particular example of bike installation where a user-contacted, or thumb-receiving, area of the device 100 is associated with its top region, and where a width axis of the device (as a whole) is substantially parallel with the ground. However, it should be noted that the device 100, with structurally associated clamp and optional adapter, can be wholly rotated about the handlebar to achieve alternate configurations during installation, such that, in another example, the aforementioned thumb-receiving area may be considered the front region, and where the aforementioned width axis of the device is substantially perpendicular to the ground. Additionally, references to rotational adjustment of the device 100 may correspond herein to a range of rotation, and may be equated with "paddle rotation" and "reach adjustment", whether referring to the device by itself, or in the context of bike installation— especially relative to the thumb of a rider/user. As well, the term "pivot" can be used in the context of rotational adjustment, and further describe an aspect of it that relates to the origin of rotation—i.e. the vertex of an angle indicating rotational range, and an associated assembly component about which pivoting occurs.

The seat dropper remote device 100 further comprises a paddle portion 110, central portion 120, and base portion 130. All three portions are rotatably integrated with one another around a single longitudinal axis running through a common assembly bolt 105 inserted proximally through the paddle portion 110. A cable clamp bolt 112 is situated adjacent to and above the assembly bolt 105 wholly within the same proximal region of the paddle portion 110, which also features a grip 111 on a top surface of its distal end. As used herein, in discussions of rotational motion, use of the terms "upward" or "downward" will refer to movement of the distal end of the paddle portion 110 having surface grip 111, as this area is the focus of reach adjustment for a user. The grip 111 coincides with the thumb-receiving area referenced above. As shown, cable clamp bolt 112 and assembly bolt 105 are on the same side of the paddle portion 110 and are in the same plane, i.e. cable clamp bolt 112 and assembly bolt 105 are coplanar. The central portion 120 mates with the proximal region of the paddle portion 110 via assembly bolt 105, and has an attached cable adjuster 125 on its distal end for fine adjustment of a motion-transmitting actuation cable (see cable 755 of FIG. 7). In one example, the paddle portion 110 is made from aluminum and the cable adjuster 125 is made of a plastic material. The base portion 130 is also joined to the central portion 120 via assembly bolt 105, and further comprises a mounting plate 131 with an installed mounting bolt 133 and mounting nut 132 that are mated to each other via a slot (see mounting slot 236 of FIG. 2) provided in the mounting plate. The mounting slot 236 is configured to receive mounting hardware, in this example mounting bolt 133 and a mounting nut 132. Loosening the mounting bolt 133 from the mounting nut 132 provides for a slidable lateral motion along the aforementioned mounting slot—which runs along nearly the entire length of the body of the mounting plate 131. The presently depicted mounting bolt 133 is tightened directly onto the mounting plate 131, and is shown to better illustrate certain features of the device 100 without depicting a full installation. In one example, the assembly bolt 105 and cable clamp bolt 112 are made of stainless steel.

As disclosed in the following discussion and drawings, an installed device 100 has a bolt attaching to the mounting plate 131 via an adapter and/or clamp, and passing through one or more distinct members before entering the mounting plate's slot. Thus, the type of bolt that is mated with the mounting nut 132 can vary, and depends on the particular handlebar-coupling configuration that is used; different lengths of bolts with varying head shapes are available to the user and may be used to that end. According to one aspect of the present invention, loosening the mounting bolt 133 enables lateral movement, allowing the repositioning of the mounting bolt 133 to any point along a length of the mounting slot. In this context, this operation causes an installed device 100 (that includes the paddle portion 110, central portion 120, and base portion 130, but not the bolt 133 and nut 132—which would be fixed) to move side-to-side relative to its coupling adapter and/or clamp, which is secured to the handlebar/bicycle. When considering the seat dropper remote device 100 alone (out of the bike context), references to lateral motion will simply refer to motion/repositioning of the mounting bolt 133 relative to the mounting plate 131 and mounting slot.

According to another aspect of the present invention, since the paddle portion 110, central portion 120, and base portion 130 share a common assembly bolt 105, loosening the bolt 105 allows for the combined rotation of the paddle portion and central portion relative to the base portion, around the aforementioned longitudinal axis coinciding with the bolt 105. This operation provides rotational/reach adjustment for the user by substantially altering the position of the paddle 110 within a range of paddle rotation. Each of the above lateral and rotational movements is fully independent and infinitely adjustable, such that one type of adjustment does not affect the other, and that there are no preset adjustment points within the ranges available. Furthermore, as a result of operating independent of one another, lateral and rotational adjustments can occur simultaneously or non-simultaneously, neither affecting the other due to operating with different structural components. The end result is a device that maximizes lateral and rotational adjustment options with a compact, economic assembly that includes only those components necessary to do so, thereby minimizing its footprint when installed. Moreover, these operations can be executed practically on the fly, without the necessity of disassembly or additional hardware. In one example, the central portion 120 and base portion 130 are made of aluminum.

Figure 2:
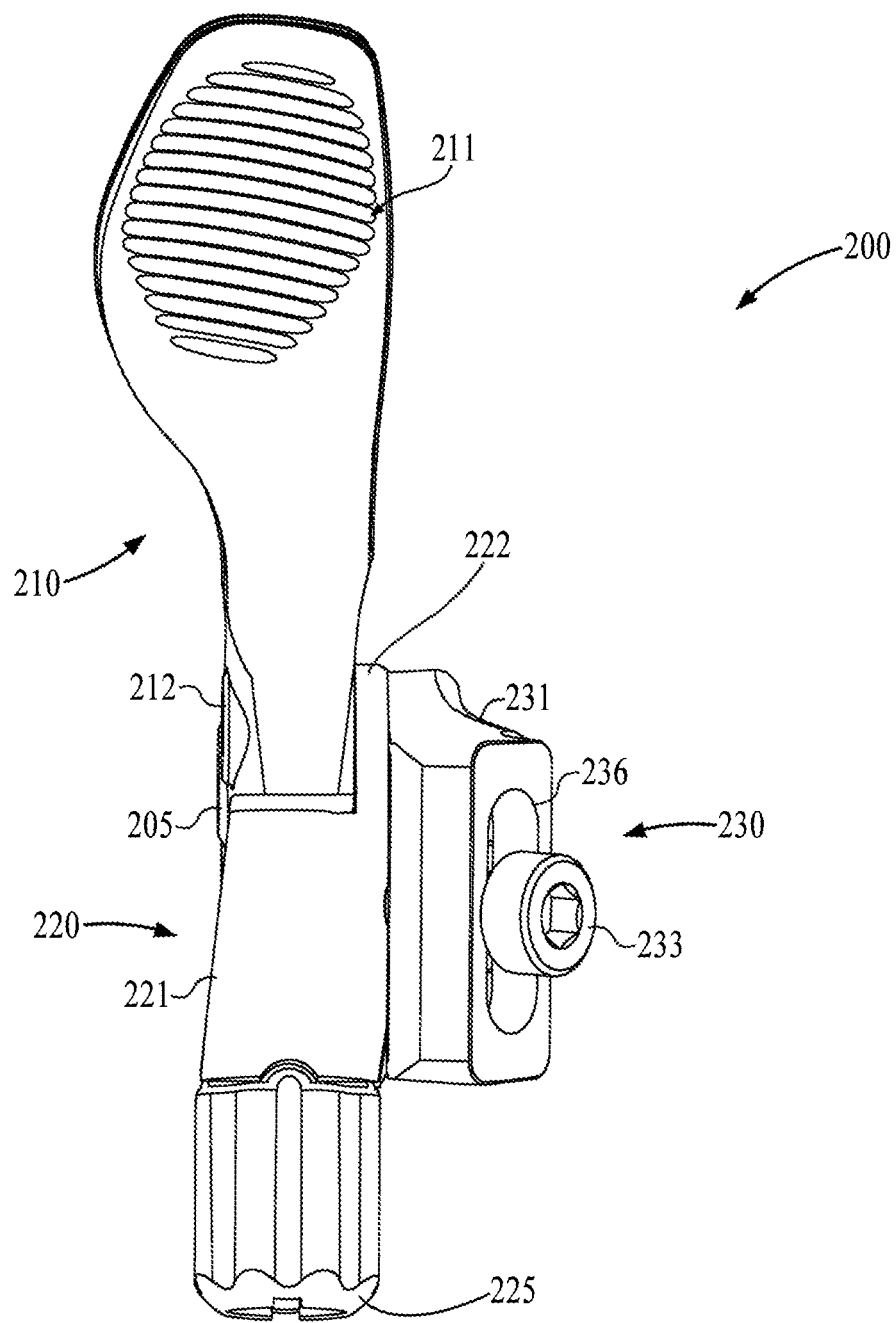
FIG. 2 depicts a top view of an exemplary seat dropper remote device in accordance with the present invention.

Referring to FIG. 2 of the drawings, a top view of an exemplary seat dropper remote device 200 is depicted in accordance with the present invention. A top surface of the paddle portion 210 is shown along with the surface grip 211 that occupies a substantial region of this surface at the paddle's distal end. The heads of the cable clamp bolt 212 and assembly bolt 205 are shown in profile, slightly protruding from the proximal region of the paddle 210, and coplanar relative to each other. As well, the overall shape and position of the central portion 220, further comprising body 221, body plate 222, and cable adjuster 225, are better visible in this view. The body 221 possesses a streamlined, slightly irregular shape which best accommodates adjacent assembled components. A lateral section of the body 221, running nearly parallel to the longitudinal axis of the paddle portion 210, extends a short way away from the body and toward the distal end of the paddle portion 210 to form the body plate 222. This plate 222 has a minimal thickness and lies between the adjacent paddle portion 210 (at its lateral proximal region) and the mounting plate 231 of the base portion 230. The surface of the body plate 222 making contact with the mounting plate 231 is a generally flat, shared surface with the body 221. This flat surface is bounded by the circular contour of the body plate 222, while running minimally across the side of the body 221—which has several angular variations in its form but is otherwise generally cylindrical. The end of the body 221 opposing the body plate 222 terminates in the attached cable adjuster 225. The base portion 230, further comprising mounting plate 231, mounting bolt 233, and mounting slot 236, is attached to both the central portion 220 and paddle portion 210 via the common assembly bolt 205. Like the body 221, the mounting plate 231 is an ergonomically shaped structure that mirrors and accommodates adjacent forms in the assembly. The mounting slot 236 is an elongated oval opening in a flat upper surface of the mounting plate 231 that is bounded by a substantially rectangular contour. The mounting bolt 233 is slidable, and can be repositioned to any point along a length of the mounting slot 236 for lateral adjustment operations, i.e. lateral adjustment of the dropper remote 200, relative to the handlebar, using the mounting hardware.

Figure 3:
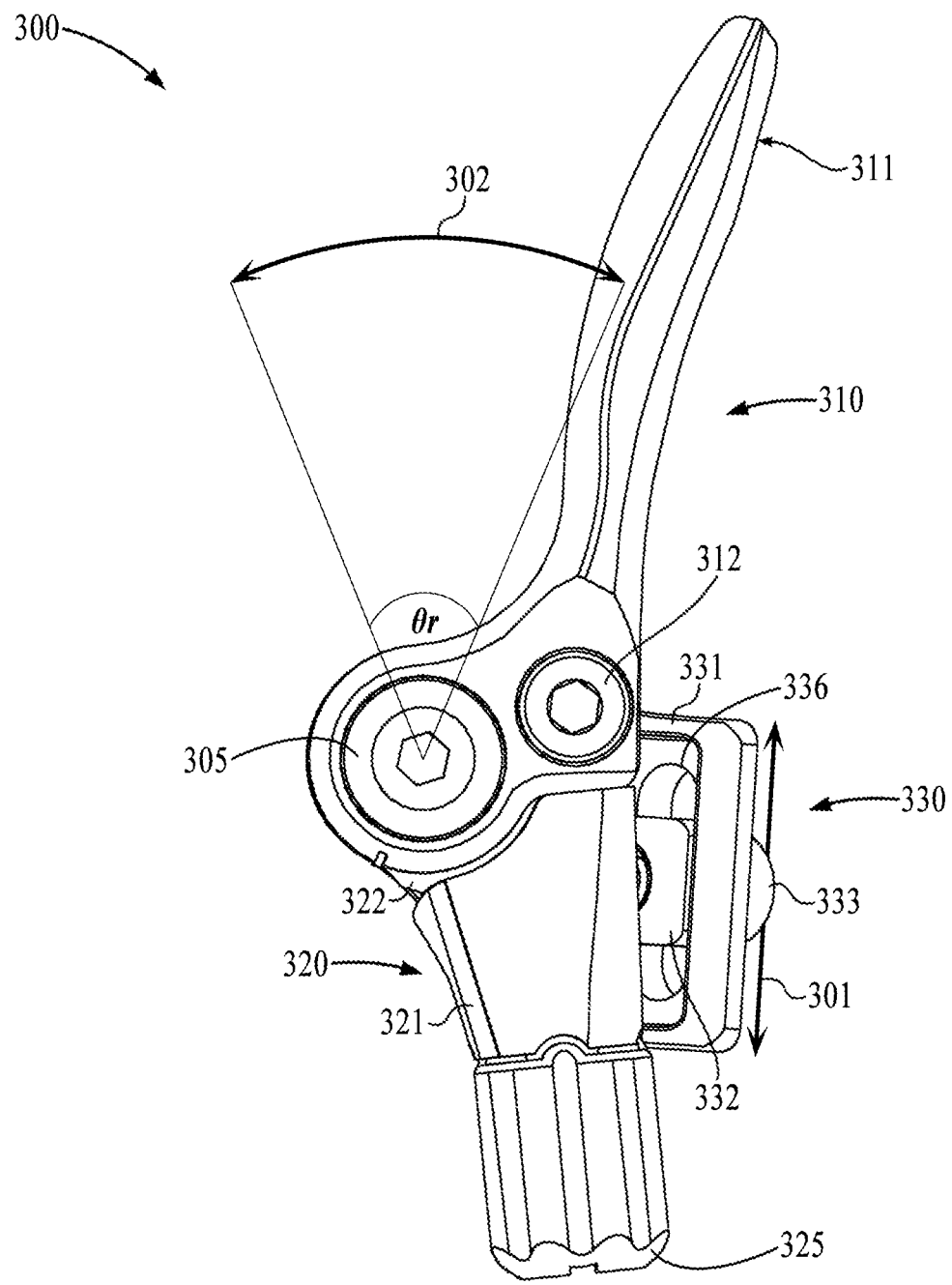
FIG. 3 depicts a front view of an exemplary seat dropper remote device in accordance with the present invention.

Referring to FIG. 3 of the drawings, a front view of an exemplary seat dropper remote device 300 is depicted in accordance with the present invention. The paddle portion 310 is formed by a lever (also referred to as a paddle or thumb switch) having a length constituting about half the length of the entire device 300. In a preferred embodiment, the grip 311 near the paddle's distal end comprises a series of substantially parallel ridges and/or grooves which are generally evenly spaced and extend away from the paddle's surface with a minimal thickness that promotes ergonomic operation of the device. Considering the front profile shown in FIG. 3, the paddle portion 310 maintains a substantially curving contour, terminating proximally with an angular shape that is adjacently mirrored by the body 321 of the central portion 320, for smooth independent rotation of the paddle relative to the body during cable actuation. It is important to note that paddle compression in the context of cable actuation is a completely separate operation from paddle rotation in a reach adjustment context, the latter entailing combined rotation of the paddle/central portion and providing a means of fixing the adjusted position into place (via loosening/tightening the assembly bolt 305). Both lateral faces of the proximal region of the paddle portion 310 are substantially flat—the back face being especially well suited for surface contact with the body plate 322 of the central portion 320. The body plate 322 has a highly similar curved contour in the above regard, allowing it to mate seamlessly with the proximal region of the paddle portion 310 via the common assembly bolt 305. The cable clamp bolt 312, positioned slightly diagonally above the assembly bolt 305 and coplanar with it, is of a smaller size and configured for securing an actuation cable. Similarly, the cable adjuster 325, attached distally to the right end of the device 300 and onto the terminal right surface of the body 321, is optimized for fine cable adjustments while promoting the ergonomic overall contour of the device 300. The base portion 330, comprising mounting plate 331, mounting slot 336, mounting bolt 333, and mounting nut 332, mates with the back surface of the body plate 322 via the common assembly bolt 305. FIG. 3 shows a cavity within the mounting plate 331 that partially houses the inserted bolt 333 and nut 332, opening at its top surface into the slot 336.

With regard to shared rotation between the paddle portion 310 and central portion 320, motion arrow 302 depicts a range of rotation; this range is denoted by angle $\theta_r$. The vertex of this angle lies about centrally on the aforementioned longitudinal axis of the common assembly bolt 305, while the rays of this angle (along with motion arrow 302) are merely illustratively convenient, and show only the approximate range of rotation in an exemplary embodiment, not the exact location of this range relative to the device 300. The assembly bolt 305 is loosened to allow for paddle rotation to occur, then tightened to complete the rotational adjustment operation. This rotational activity occurs without interference between the paddle and central portions 310 and 320, collectively, and the mounting components of the base portion 330. In one embodiment, the rotational range for infinite reach adjustment is about 30 degrees. In another embodiment, the rotational range for infinite reach adjustment is up to 45 degrees.

Regarding lateral motion of the device 300 as a whole, motion arrows 301 depict a range of side-to-side movement along the length of the mounting slot 336. The exemplary embodiment shown allows for infinite adjustment along the entire length of the mounting slot 336, such that (in a bike context) the bolt 333 can be loosened, the device 300 repositioned, and the bolt tightened and thus resecured to any point along a length of the slot. This lateral activity occurs without interference between components found on the base portion 330 and the paddle and central portions 310 and 320 respectively, including any components that they further comprise. In a preferred embodiment, about 10 mm of infinite lateral adjustment can be made via this operation.

Figure 4:
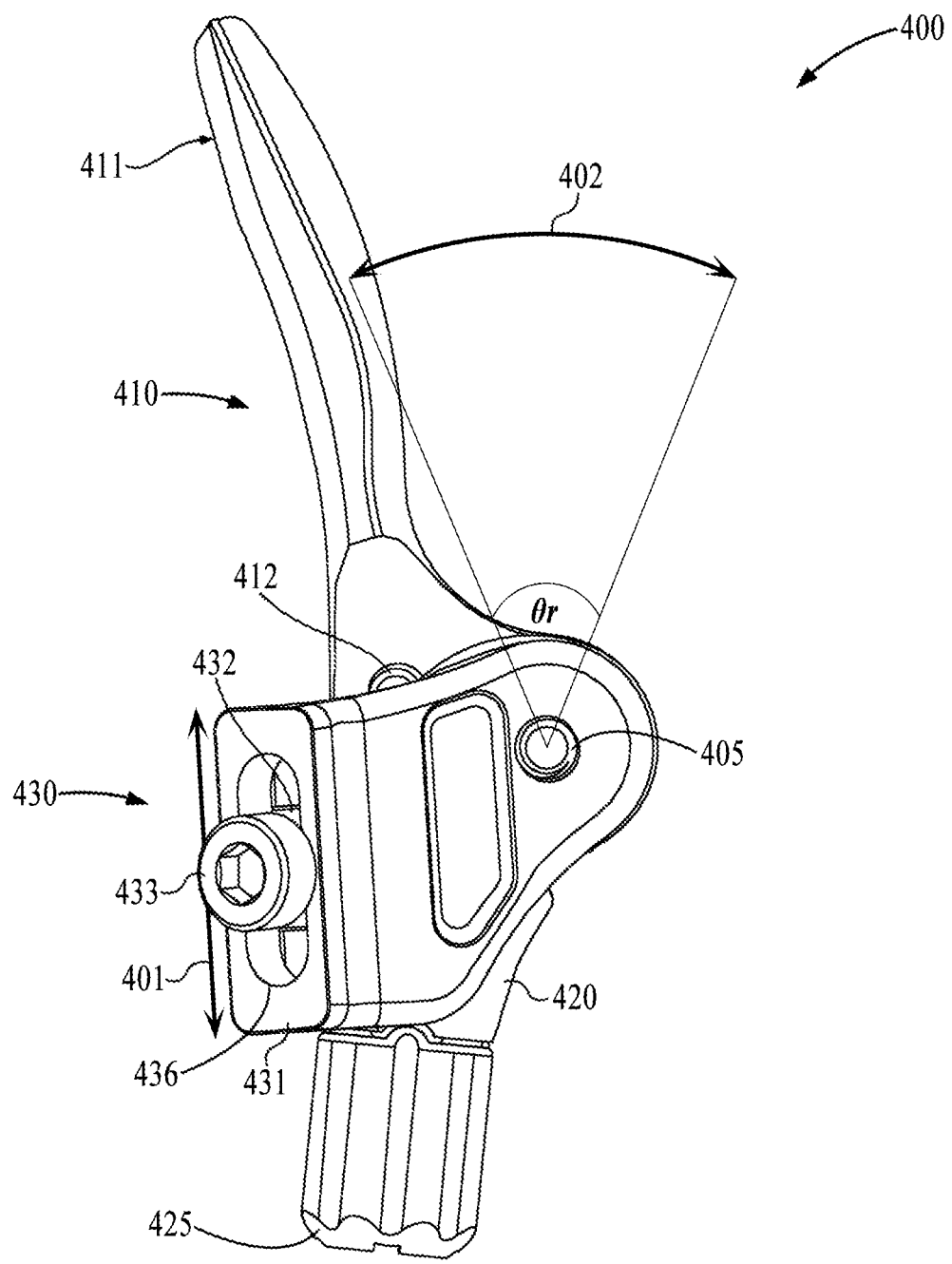
FIG. 4 depicts a back view of an exemplary seat dropper remote device in accordance with the present invention.

Referring to FIG. 4 of the drawings, a back view of an exemplary seat dropper remote device 400 is depicted in accordance with the present invention. The inserted/threaded end of the assembly bolt 405 is visible, protruding from a back surface of the mounting plate 431 in this view. By loosening the assembly bolt 405, a user can pivot the paddle 410 and central portion 420 around it to vary the distance between paddle (specifically the area of grip 411) and handlebar, thus taking advantage of extensive reach adjustment, as indicated by motion arrow 402. Tightening the assembly bolt 405 completes the operation of reach adjustment. Again, angle $\theta_r$ shows the approximate range of paddle rotation in one example.

The inserted/threaded end of the cable clamp bolt 412 partially protrudes from the proximal region of the paddle portion 410, the proximal region being substantially flat and suited for contact with the central portion 420. The distal end of the paddle portion 410, with grip 411, assumes a more curved shape. As is made evident by the view shown, the largely obscured central portion 420 shares a substantially similar contour with the base portion 430, more so around its proximal region, near the assembly bolt 405. The central portion 420 terminates with attached cable adjuster 425 near the right side of the mounting plate 431. Like the central portion 420, the base portion 430 has an irregular shape that mirrors that of adjacent parts where appropriate for maximal ergonomics. For example, the mounting plate 431 curves around the common assembly bolt 405 and has a contour that is substantially flush with the central and paddle portions 420 and 410 respectively, in the same region. Nearly midway up its height, the plate 431 gradually assumes a more rectangular shape, and terminates in a wider upper mounting area that is substantially rectangular, with rounded edges and corners and a flat upper surface where the mounting slot 436 accepts the mounting bolt 433. The slot 436 has a minimal depth that terminates into the abovementioned cavity that partially houses the mounting bolt 433 and nut 432. Motion arrows 401 indicate lateral movement/repositioning of the mounting bolt 433 along the mounting slot 436, i.e. lateral adjustment of the device 400 when installed on a handlebar via mounting hardware.

Figure 5:
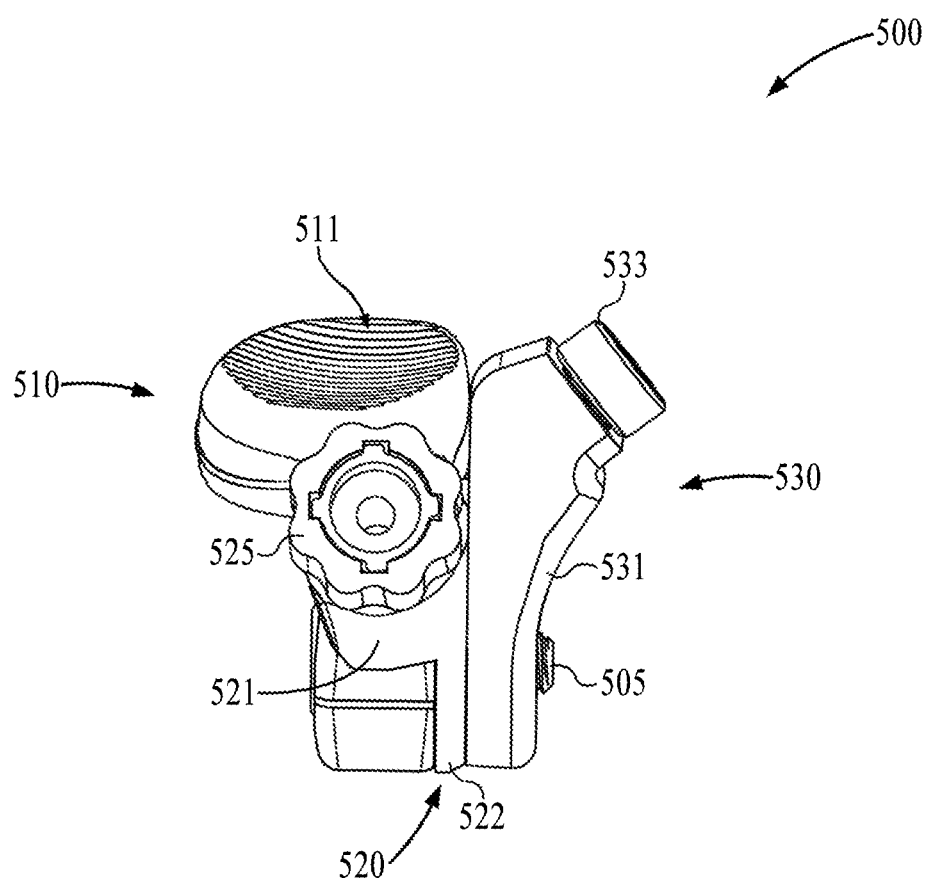
FIG. 5 depicts a right side view of an exemplary seat dropper remote device in accordance with the present invention.

Referring to FIG. 5 of the drawings, a right side view of an exemplary seat dropper remote device 500 is depicted in accordance with the present invention. The rotational and lateral position shown in this and the foregoing drawings can be understood as a standard installed configuration (see FIG. 7), or resting position, wherein the longitudinal axis of the paddle portion 510 is nearly parallel to that of the handlebar (the vertical axis of the base portion 530 being nearly perpendicular to it), and the mounting bolt 533 is located centrally along the length of the slot in the mounting plate 531. In this resting position, the height of the entire device 500 is nearly equivalent to that of the base portion 530 alone. This further highlights the streamlined quality of device 500, due to the relative size and shape of the assembled parts; the assembly is configured to be as compact and lightweight as possible, while maximizing ergonomic features—especially those of the paddle portion 510. The surface grip 511 can be seen occupying a substantial portion of the top surface of the paddle portion 510. A nearly straight-on view of the cable adjuster 525 shows its inner cavities, into which a motion-transmitting actuation cable is inserted during installation. The cable adjuster 525 is rotatably integrated into the assembly, attaching to the body 521. The assembly bolt 505 passes completely through the proximal region of the paddle portion 510, the body plate 522 of the central portion 520, and the mounting plate 531 of the base portion 530 via axially aligned openings (seen in FIG. 6), protruding minimally out from the back surface of the plate 531.

Figure 6:
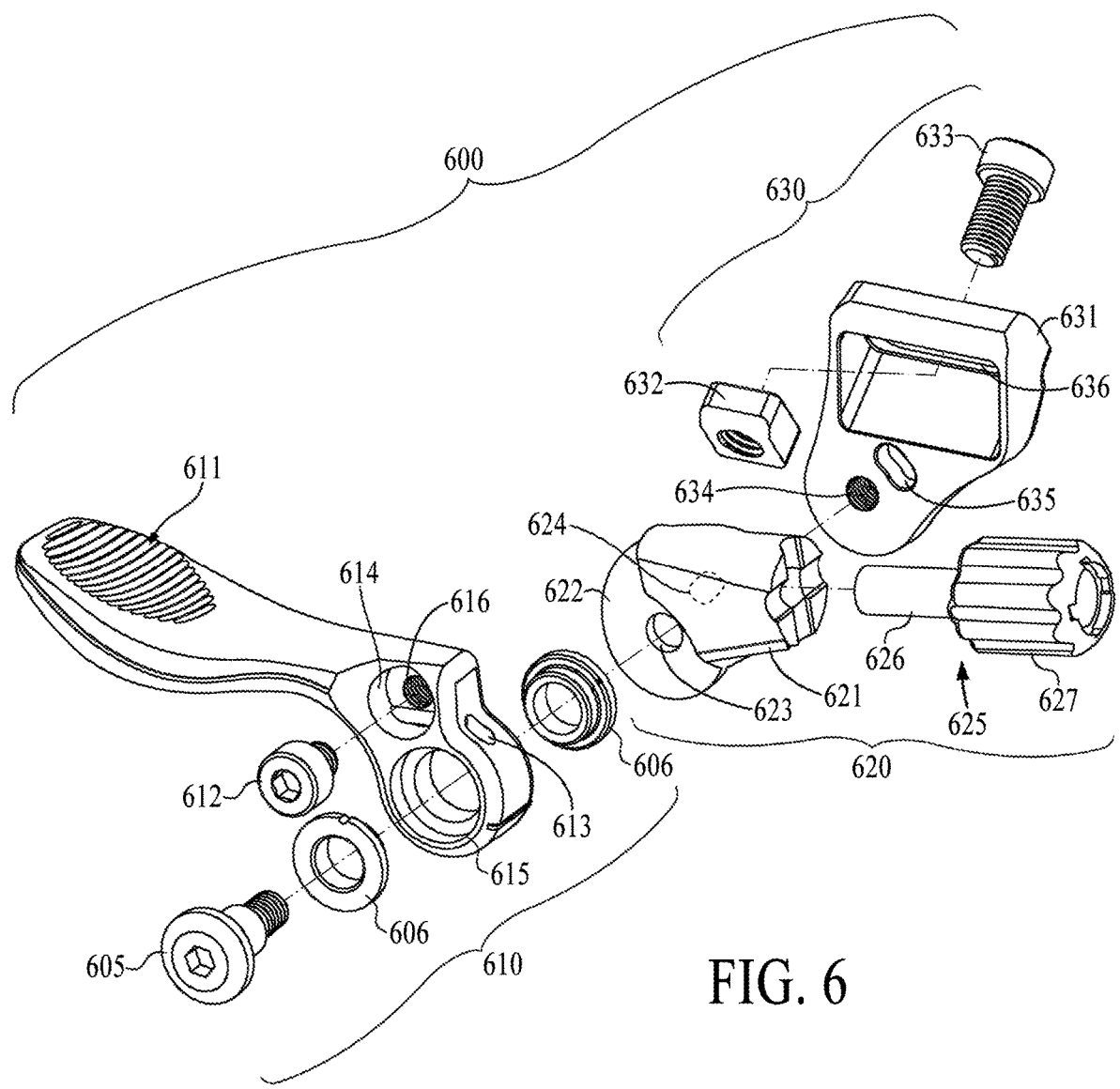
FIG. 6 depicts an exploded view of an exemplary seat dropper remote device in accordance with the present invention.

Referring to FIG. 6 of the drawings, an exploded view of an exemplary seat dropper remote device 600 is depicted in accordance with the present invention. The paddle portion 610 further comprises surface grip 611, passing channel 613, assembly bolt cavity 615, cable bolt cavity 614, and threaded inner hole 616. The paddle portion 610 also further comprises several insertable components, including cable clamp bolt 612, assembly bolt 605, and bushings 606. The passing channel 613 runs lengthwise along the entire proximal region of the paddle portion 610, having openings on opposing sides of the region through which an actuation cable (see actuation cable 755 of FIG. 7) may be fed. The opening through which the cable enters is visible in FIG. 6. A portion of the passing channel 613 that is visible within the cable bolt cavity 614 is an approximately halved (circumferentially) cylindrical concavity that supports the inserted actuation cable, making contact with it on a substantial portion of its surface as the inserted cable clamp bolt 612 is turned and secured into place. The cylindrical cable bolt cavity 614 accommodates substantially all of, or all of, the head of cable clamp bolt 612. The threaded portion of the cable clamp bolt 612 is mated with the threaded inner hole 616, while an adjacent surface of the bolt's head makes heavy contact with the actuation cable, thereby fixing its position. The cylindrical assembly bolt cavity 615, which accepts assembly bolt 605, has dual circumferential recesses around its front and back regions that flank an inner opening of smaller diameter; this is to accommodate the two-tiered body of each bushing 606. In more detail, each bushing 606 has a large and small diameter tier, the latter of each meeting about centrally within the assembly bolt cavity 615, near or on a plane intersected by the longitudinal axis of the paddle portion 610. An exemplary embodiment of the present invention opts for use of a bushing or plain bearing, in large part due to the reduction in weight it offers, as opposed to a bearing with rolling elements. Additionally, a bushing can be more compact and durable, while also being cost-effective in production. The bushings 606 may be lubricated or not, depending on their compositions and other factors, as known in the art, and mitigate friction and wear between the inserted assembly bolt 605 and assembly bolt cavity 615. In one example, the bushings 606 are made from Polytetrafluoroethylene (PTFE).

The central portion 620 further comprises body 621 with body plate 622, and insertable cable adjuster 625 with extended hollow stem 626 and adjustment barrel 627. The barrel 627 is a largely tubular structure with an undulating surface that is suitable for gripping and adjustment. The cable adjuster 625 enters through an opening with channel centrally located within the body 621. The body plate 622 has a body bolt hole 623 centrally located on the body plate through which the assembly bolt 605 can pass. From the back side of the body plate 622, a rotational adjustment pin 624 (shown with dashed lines as it is not visible in this view) protrudes, and is substantially insertable into an adjustment cavity 635 found on a front surface of the mounting plate 631 when the device 600 is assembled. The pin 624 is a cylindrical protrusion with a rounded edge at its free end— which has a flat terminal surface. The adjustment cavity 635 is a substantially oval-shaped opening with width similar to the diameter of adjustment pin 624, and a length that is about two to three times that of the same dimension. During rotational movements of the paddle and central portions 610 and 620, respectively, the adjustment pin 624 travels the length of the adjustment cavity 635, being bounded by the two opposing sides (lengthwise) of the cavity. This structural association between pin 624 and cavity 635 prevents the device 600 from continuously spinning around the base portion 630 during rotational adjustment. The base portion 630 further comprises inserted mounting bolt 633 with mounting nut 632, mounting slot 636, and base bolt hole 634—which is threaded to accept the common assembly bolt 605. Fully tightening the assembly bolt 605 secures the assembly together, preparing the seat dropper remote device 600 for installation onto a bicycle handlebar or finalizing a reach adjustment operation.

Figure 7:
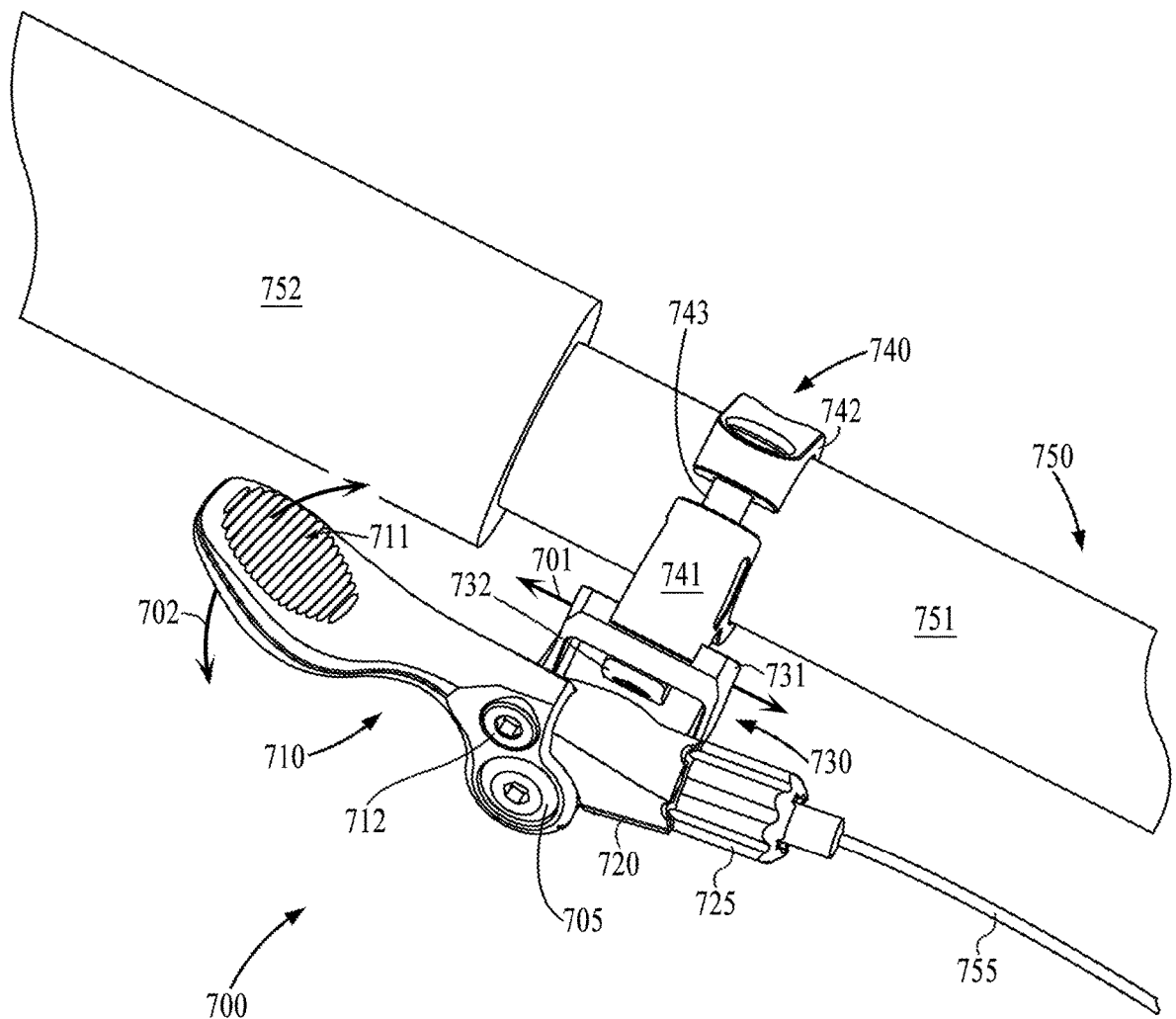
FIG. 7 depicts a perspective view of an exemplary seat dropper remote device installed on a bicycle handlebar via a 22.2 mm clamp in accordance with the present invention.

Referring to FIG. 7 of the drawings, a perspective view of an exemplary seat dropper remote device 700 installed on a bicycle handlebar 751 via a 22.2 mm clamp 740 is depicted in accordance with the present invention. A conventional bicycle 750 with standard 22.2 mm diameter handlebar 751 and bar grip 752 accepts a bar clamp 740 capable of matching that diameter at its inner diameter. The conventional bar clamp 740 further comprises a proximal half 741, distal half 742, and bar clamp bolt 743. Both halves of the bar clamp 740 are tightened together via the bar clamp bolt 743 to circumferentially exert pressure upon the contacted surface of the handlebar, securing the clamp and coupling the connected device 700. The bar clamp bolt 743 passes through a hole in the distal half 742, and inserts into and fully through a tubular structure of the proximal half 741, exiting it and passing through the mounting slot (see mounting slot 636 of FIG. 6). In this configuration of the present invention, the bar clamp bolt 743 is structurally associated with the mounting plate 731 and mounting nut 732 of the base portion 730 in the same manner as the abovementioned mounting bolt (see mounting bolt 633 of FIG. 6). Thus, the threaded bar clamp bolt 743 is tightened onto the mounting plate 731 through the attached nut 732, simultaneously tightening the proximal/distal members of the bar clamp 740 together. Subsequent loosening of the bar clamp bolt 743 allows lateral adjustment of the device 700, as indicated by motion arrows 701 which show approximate side-to-side movements of the mounting plate 731. A motion-transmitting actuation cable 755 inserted into the cable adjuster 725 passes through the central portion 720 and paddle portion 710, protruding somewhere near a bottom surface of the paddle. The cable clamp bolt 712 is tightened to fully secure the cable 755, while the assembly bolt 705 is loosened/tightened to control infinite reach adjustment—indicated by rotational motion arrows 702. As with motion arrows 701, the range of rotation shown by arrows 702 is approximate and given only by way of example with respect to the range of paddle rotation, as well as the exact location of this range relative to the device 700. Typically, a user places their thumb onto the surface grip 711 of the paddle portion 710 and applies pressure to actuate the cable. This operation, like rotational adjustment, causes pivoting of the device around the assembly bolt 705, only affecting the paddle portion 710 in this case. Compression of the paddle pulls on the actuation cable due to the tightened clamp bolt 712. Again, it will be noted that cable actuation and rotational paddle adjustments are mutually independent operations; each utilizes different structural components and both can be executed simultaneously or non-simultaneously without interfering with the structural/functional aspects of the other.

Figure 8:
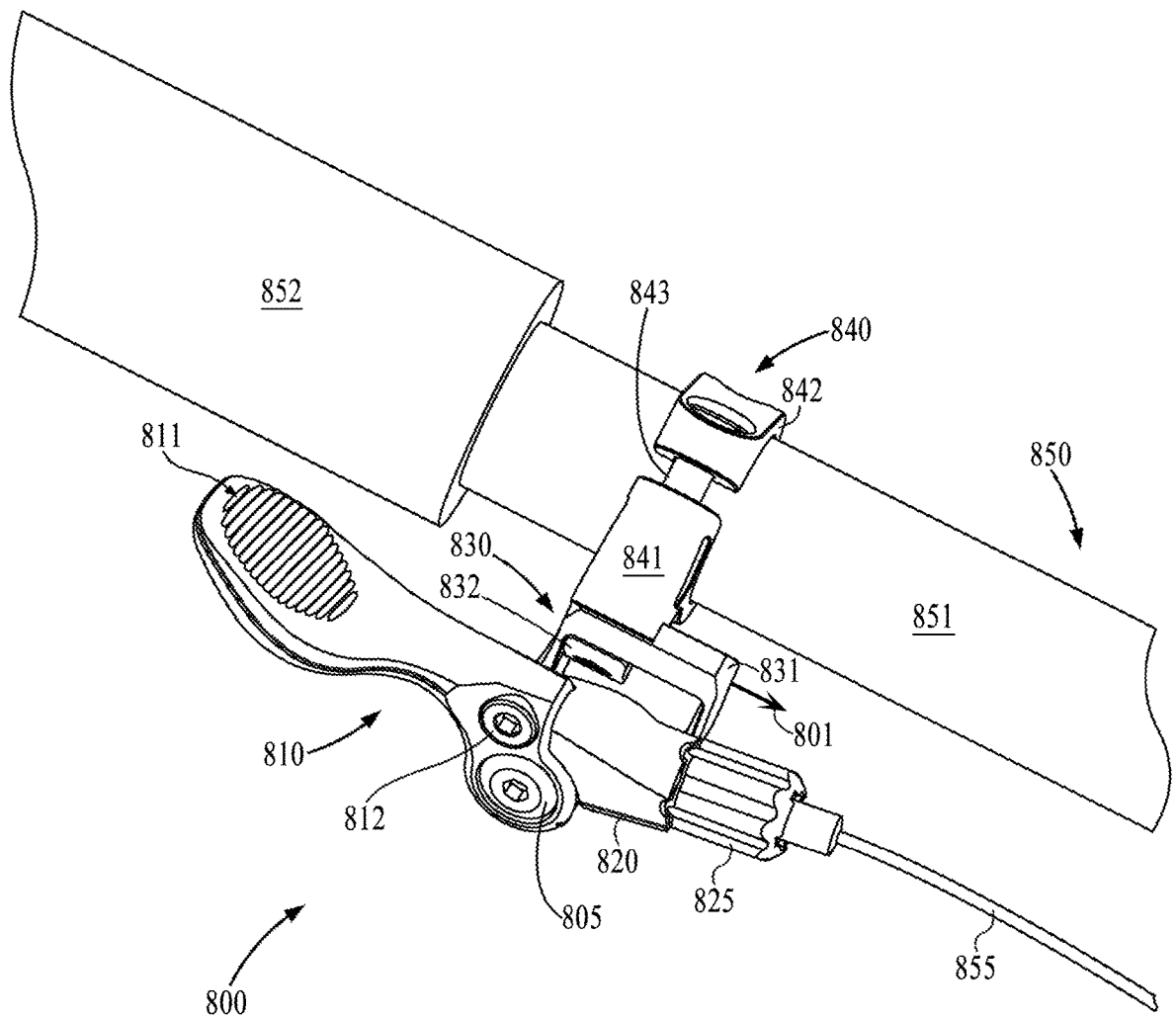
FIG. 8 depicts a perspective view of an exemplary seat dropper remote device installed on a bicycle handlebar via a 22.2 mm clamp and adjusted laterally inboard in accordance with the present invention.

Referring to FIG. 8 of the drawings, a perspective view of an exemplary seat dropper remote device 800 installed on a bicycle handlebar 851 via a 22.2 mm clamp 840 and adjusted laterally inboard is depicted in accordance with the present invention. The use of the terms "inboard" and "outboard" herein refer to locations closer to and farther from the longitudinal axis of the bicycle 850, respectively, along the length of the handlebar 851. To achieve this inboard configuration, a user can loosen the bar clamp bolt 843 from the attached mounting nut 832 found on the mounting plate 831, taking care to steady the distal and proximal halves 842 and 841 respectively of the clamp 840 if necessary. The user is then free to laterally adjust the device 800, with paddle, central, and base portions 810, 820, and 830, respectively, to the right (toward the bike's center, or longitudinal axis), as indicated by motion arrow 801. This operation slides one or more top surfaces of the mounting plate 831 along a terminal bottom region of the proximal half 841. The bolt 843 may then be re-tightened after the desired position is achieved. A user with longer fingers, for example, may benefit from this inboard configuration, as it increases the distance between the bar grip 852 and surface grip 811 of the paddle portion 810. As a consequence of the altered configuration, the user may desire to readjust the actuation cable 855 via the cable adjuster 825 and/or the cable clamp bolt 812. The assembly bolt 805 is not affected by operations associated with this configuration.

Figure 9:
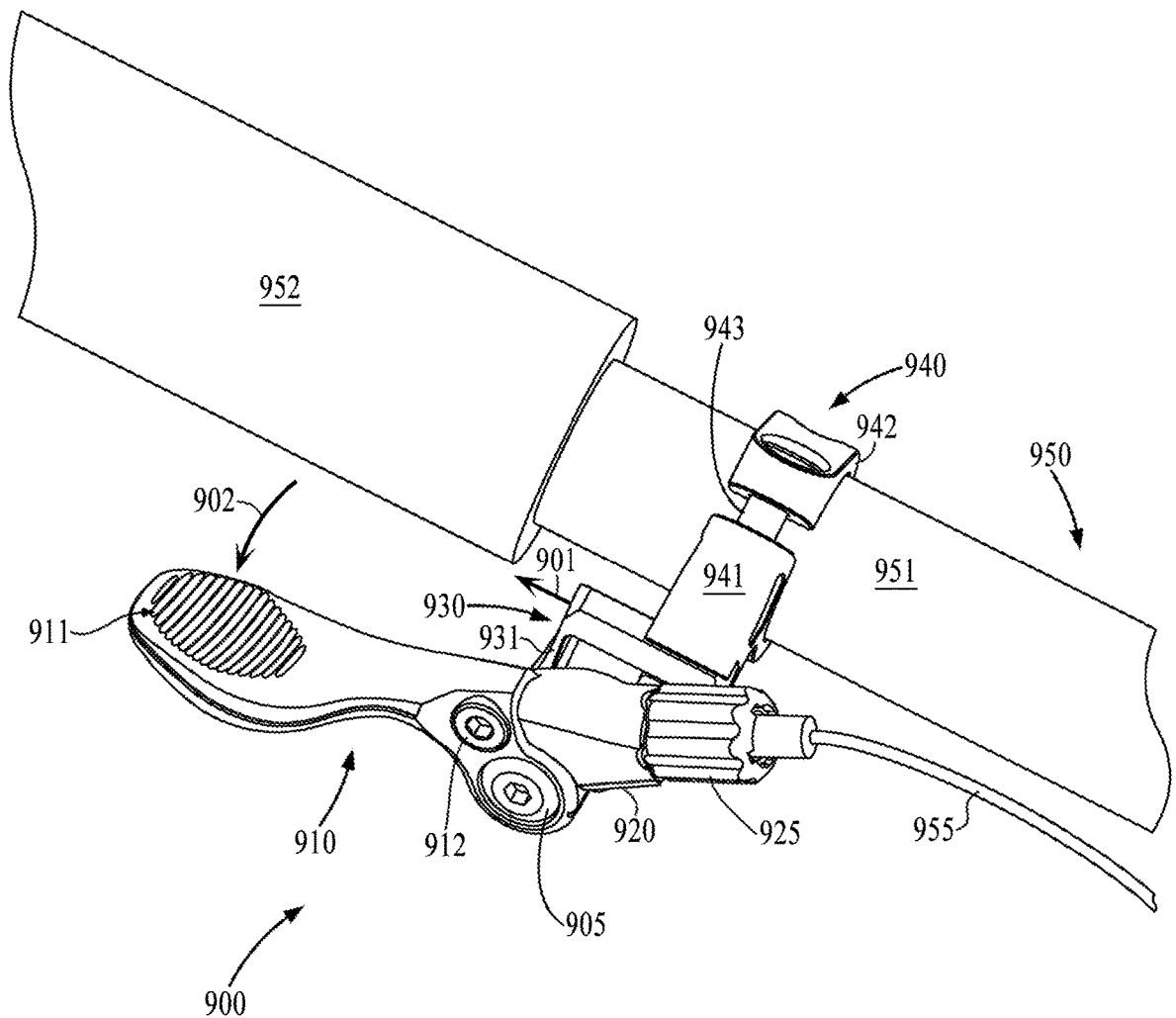
FIG. 9 depicts a perspective view of an exemplary seat dropper remote device installed on a bicycle handlebar via a 22.2 mm clamp and adjusted laterally outboard and rotationally downward in accordance with the present invention.

Referring to FIG. 9 of the drawings, a perspective view of an exemplary seat dropper remote device 900 installed on a bicycle handlebar 951 via a 22.2 mm clamp 940 and adjusted laterally outboard and rotationally downward is depicted in accordance with the present invention. To achieve this outboard configuration, the user repeats the abovementioned loosening activity of the bar clamp bolt 943 running through the distal and proximal halves 942 and 941 respectively, then slides the mounting plate 931 outboard, moving the device 900 away from the center of the bicycle 950 and toward the bar grip 952. Motion arrow 901 indicates this adjustment. The bar clamp bolt 943 can be retightened once the lateral position is altered as desired. The user can also choose to alter the rotational position of the device 900 by loosening the assembly bolt 905 and pivoting the paddle and central portions 910 and 920 respectively around the bolt, thus rotating these portions together relative to the base portion 930, which remains still during this operation. In this configuration, the paddle portion 910 is rotated downward, away from the bar grip 952, as indicated by motion arrow 902. This places the surface grip 911 laterally nearer to but vertically farther from the bar grip 952, offering a unique combination of position alterations for a user, and allowing the device 900 to cater to a diverse range of grip styles and finger lengths. For example, such a configuration may benefit a user with shorter fingers but looser grip. In any case, the benefit of adding infinite reach adjustment to infinite lateral adjustment results in extensive fine adjustment of the remote device 900. As with the above activities associated with an inboard configuration, the user may subsequently choose to readjust the actuation cable 955 via the cable adjuster 925 and/or cable clamp bolt 912.

Figure 10:
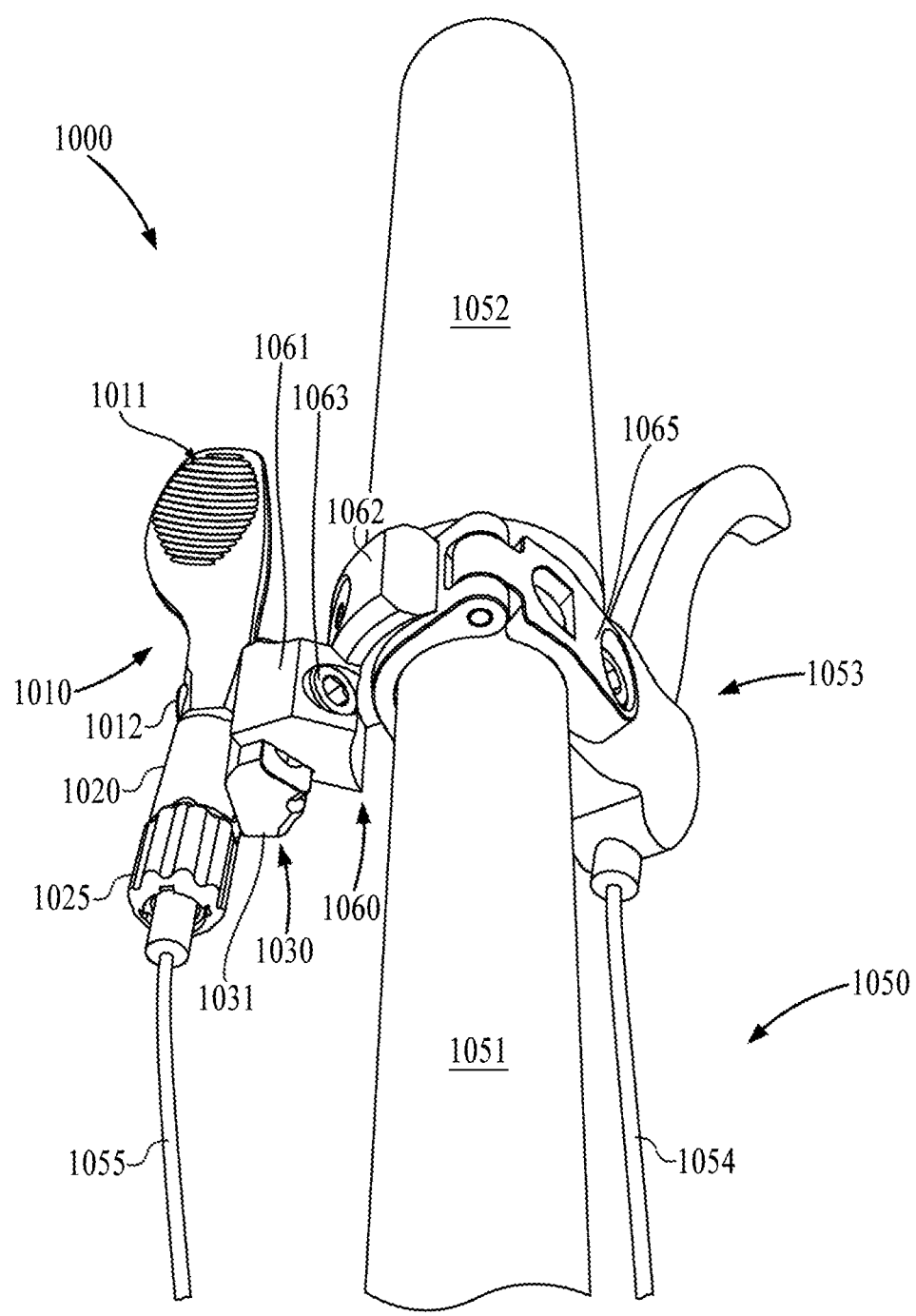
FIG. 10 depicts a perspective view of an exemplary seat dropper remote device installed on a SRAM® brake clamp via a Matchmaker adapter in accordance with the present invention.

Referring to FIG. 10 of the drawings, a perspective view of an exemplary seat dropper remote device 1000 installed on a SRAM® brake clamp 1065 via a Matchmaker brake adapter 1060 is depicted in accordance with the present invention. Similar to the abovementioned 22.2 mm clamp (see FIGS. 7-9), the SRAM® brake clamp 1065 circumferentially attaches to a handlebar 1051 of a bicycle 1050, adjacent to the bar grip 1052. The SRAM® brake clamp 1065 includes an adapter for connection with seat remote dropper devices, known as the "Matchmaker" adapter (i.e. Matchmaker brake adapter 1060) that further comprises a proximal attachment plate 1061 and a distal coupling plate 1062. On the side of the handlebar 1051 opposing the device/adapter mounting, the brake clamp 1065 attaches to a brake lever 1053 with brake cable 1054 that leads to a braking system via conventional means as known in the art. The adapter 1060 mounts to the base portion 1030 of the device 1000 via a mounting bolt 1063. The mounting bolt 1063 inserts through the proximal attachment plate 1061 and into the mounting plate 1031 of the remote device 1000. In one example, the Matchmaker brake adapter 1060 is made of aluminum and the mounting bolt 1063 is made of stainless steel. As in the aforementioned 22.2 mm clamp configuration, the device 1000 may be laterally adjusted inboard or outboard by loosening the mounting bolt 1063. As well, the paddle and central portions 1010 and 1020 respectively can be pivoted relative to the base portion 1030 for infinite reach adjustment within a range of about 30-45 degrees. In this coupling configuration, a user may desire to more accessibly position the paddle portion 1010, especially the surface grip 1011, due to the possible added thickness of the mounting/coupling members, and can better accomplish this with the dual-adjustment capabilities of the remote device 1000. Fine adjustment and securing operations with the actuation cable 1055 can be executed via the cable adjuster 1025 and cable clamp bolt 1012 respectively.

Figure 11:
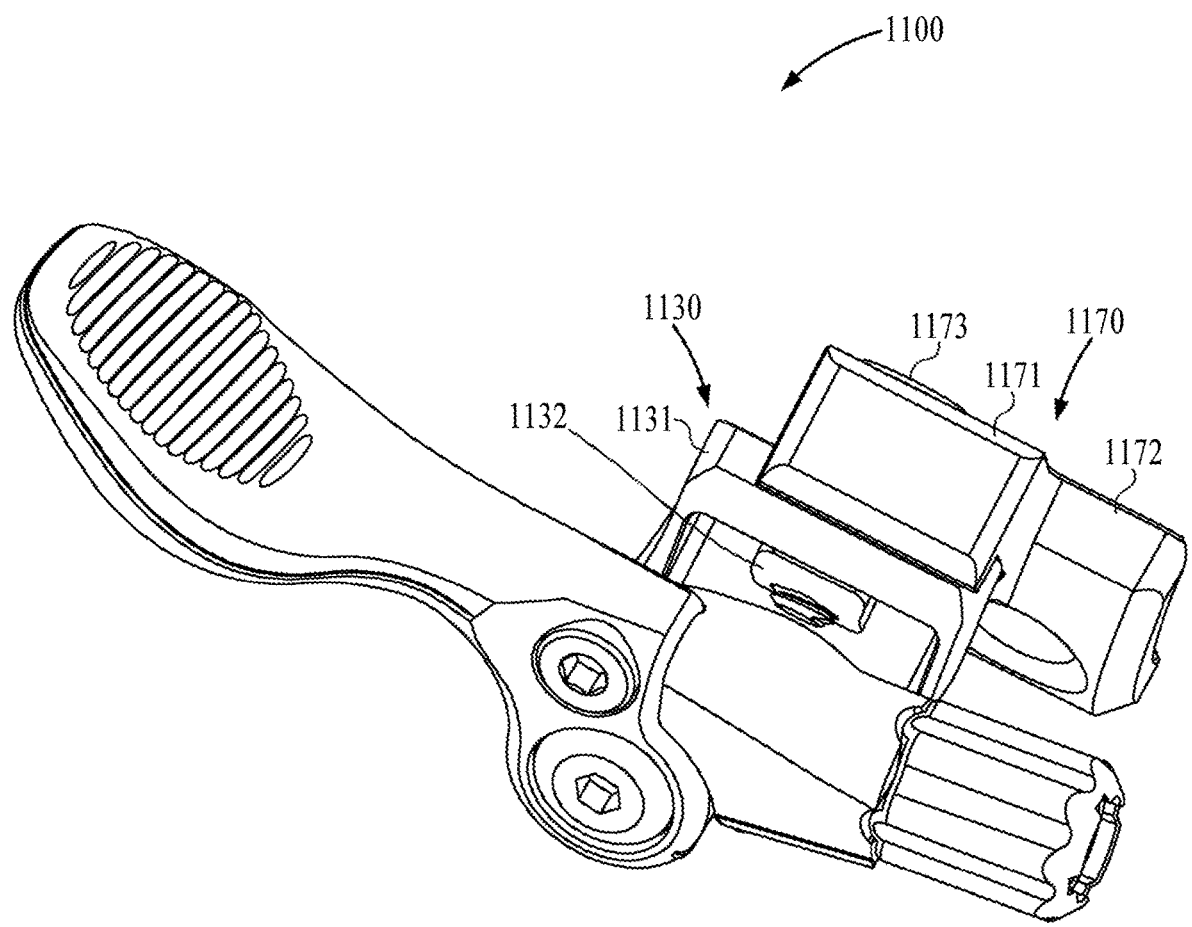
FIG. 11 depicts a perspective view of an exemplary seat dropper remote device attached to an I-Spec EV adapter in accordance with the present invention.

Referring to FIG. 11 of the drawings, a perspective view of an exemplary seat dropper remote device 1100 with an adapter 1170 is depicted in accordance with the present invention. In this example, the adapter 1170 is configured to facilitate the connection of the seat dropper remote device 1100 with a Shimano® I-Spec EV brake system (shown in FIG. 12). As such, the adapter 1170 could be configured differently for connection with a different brake type. The adapter 1170 further comprises a proximal attachment plate 1171 and distal coupling plate 1172, the latter of which is positioned below and to the right with respect to its proximal plate, and in a direction away from the mounting plate 1131 and toward the brake clamp (see Shimano® brake clamp 1280 of FIG. 12). Thus, in this example, the distal coupling plate 1172 is positioned below, and substantially offset from, the proximal attachment plate 1171. Conversely, the proximal attachment plate 1171 is positioned toward the mounting plate 1131 and in a direction away from the brake clamp. The adapter 1170 is manufactured to conform to the contours of the mounting plate 1131 of the base portion 1130. A mounting bolt 1173 inserts through a hole in the proximal attachment plate 1171 and passes through the mounting plate 1131. The mounting bolt 1173 is secured with the mounting nut 1132. A seat dropper remote device 1100 that is mounted via the adapter 1170 can be coupled with a Shimano® brake lever assembly as seen in the following drawing. In one example, the adapter 1170 is made of aluminum and the mounting bolt 1173 is made of stainless steel.

Figure 12:
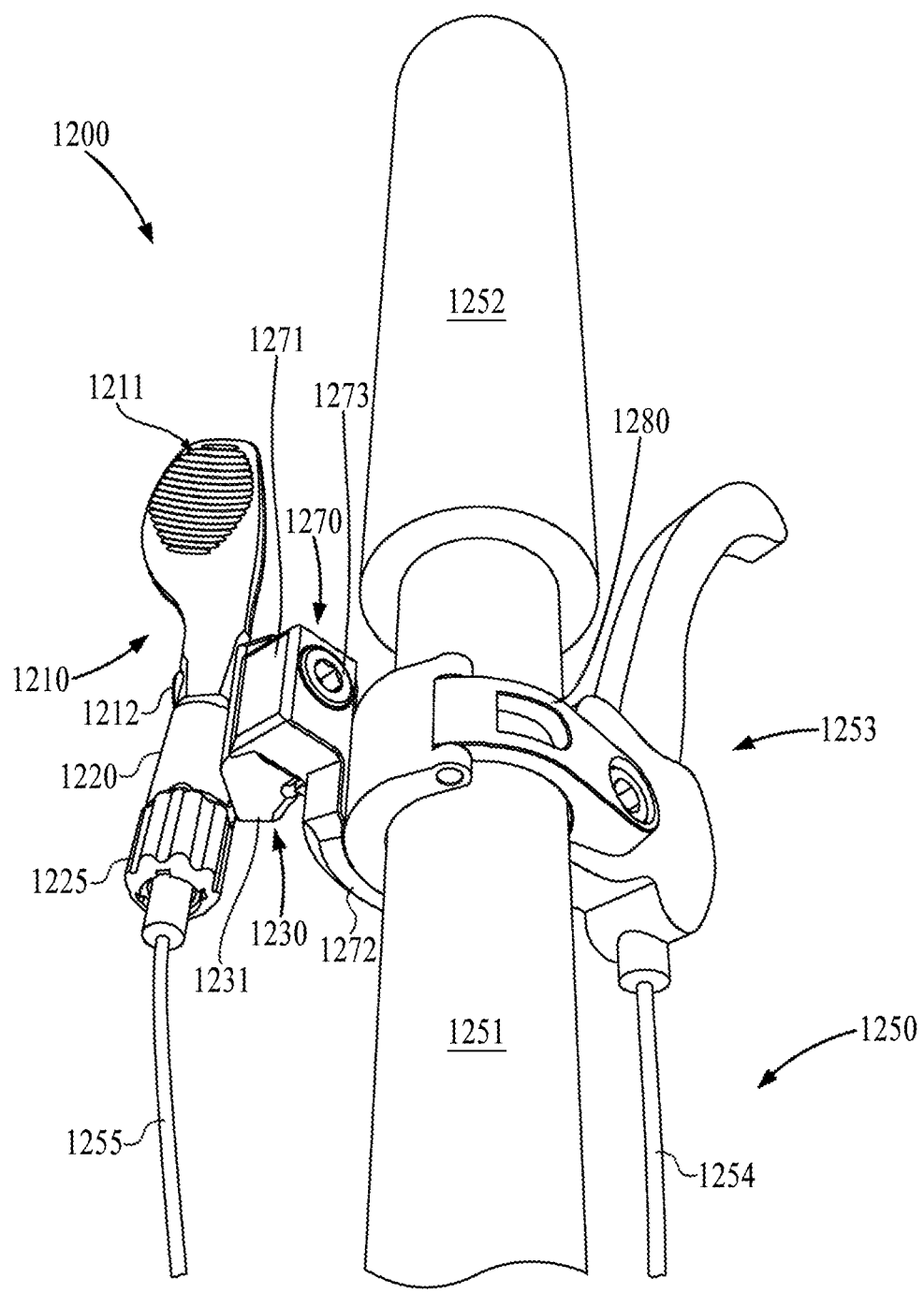
FIG. 12 depicts a perspective view of an exemplary seat dropper remote device installed on a Shimano® brake clamp via an I-Spec EV adapter in accordance with the present invention.

Referring to FIG. 12 of the drawings, a perspective view of an exemplary seat dropper remote device 1200 installed on a Shimano® brake clamp 1280 via an adapter 1270 (adapter 1170 of FIG. 11) is depicted in accordance with the present invention. As in FIG. 10 (with reference to the SRAM® brake clamp 1065), the Shimano® brake clamp 1280 circumferentially attaches to a handlebar 1251 of a bicycle 1250, close in proximity to the bar grip 1252. It couples with the adapter 1270 that further comprises proximal attachment plate 1271 and distal coupling plate 1272. In the example shown in FIG. 12, the distal coupling plate 1272 is positioned below the proximal attachment plate 1271. On the side of the handlebar 1251 opposing the device/adapter mounting, the brake clamp 1280 attaches to a brake lever 1253 with brake cable 1254 that leads to a braking system via conventional means. The adapter 1270 mounts to the base portion 1230 of the device 1200 via mounting bolt 1273. The mounting bolt 1273 inserts through the proximal attachment plate 1271 and into the mounting plate 1231 of the remote device 1200. As in the aforementioned SRAM® brake clamp configuration, the device 1200 may be laterally adjusted inboard or outboard by loosening the mounting bolt 1273. As well, the paddle and central portions 1210 and 1220 respectively can be pivoted relative to the base portion 1230 for infinite reach adjustment within a range of about 30 to 45 degrees. Like in the above brake-coupling configuration, a user may desire to more accessibly position the paddle portion 1210, especially the surface grip 1211, due to the possible added thickness of the mounting/coupling members, and is well equipped to do this with the dual-adjustment capabilities of the remote device 1200. Again, fine adjustment and securing operations with the actuation cable 1255 can be executed via the cable adjuster 1225 and cable clamp bolt 1212 respectively. The assembly bolt (see assembly bolt 905 of FIG. 9) runs through paddle, central, and base portions 1210, 1220, and 1230 respectively, and lies adjacent to, and coplanar with, cable clamp bolt 1212. Other brake adapters and clamps of various sizes and shapes can be coupled with the remote device 1200 onto a number of different brake levers. New adapters can be manufactured that pair with new braking systems/levers, and the remote device 1200 is highly adaptable to such products while maintaining the aforementioned infinite dual-adjustment features.

While there have been described herein what are considered to be preferred and exemplary embodiments of the present invention, other modifications of the invention shall be apparent to those skilled in the art from the teachings herein. It is noted that the embodiments disclosed are illustrative rather than limiting in nature and that a wide range of variations, modifications, changes, substitutions are contemplated in the foregoing disclosure and, in some instances, some features of the present invention may be employed without a corresponding use of other features. Many such variations and modifications may be considered desirable by those skilled in the art based upon a review of the foregoing description of preferred embodiments.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this Specification are used to describe and account for small fluctuations, such as due to variations in processing. For example, they can refer to less than or equal to 5%, such as less than or equal to 2%, such as less than or equal to ±1%, such as less than or equal to +0.5%, such as less than or equal to +0.2%, such as less than or equal to +0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A seat dropper remote device comprising:
   (a) a base portion comprising a mounting plate for mounting to a bar clamp on a bicycle handlebar, an adjustment cavity, and a base bolt hole, the mounting plate having a mounting slot to receive a mounting bolt that connects the base portion to the bar clamp, wherein the base portion and the bar clamp are configured such that tightening the mounting bolt simultaneously secures the base portion to the bar clamp and the bar clamp to the handlebar;
   (b) a central portion connected with the base portion, the central portion comprising a body that receives a cable adjuster, the central portion configured to receive an actuation cable, wherein the body includes a body plate, the body plate having a body bolt hole and a rotational adjustment pin; and
   (c) a paddle portion connected with the central portion, the paddle portion configured to secure and actuate the actuation cable, the paddle portion comprising an assembly bolt cavity and an assembly bolt, wherein the assembly bolt passes through the assembly bolt cavity of the paddle portion, the body bolt hole of the central portion, and the base bolt hole of the base portion, wherein the assembly bolt is configured to provide rotational adjustment of the paddle portion relative to the base portion, and wherein the mounting bolt is configured to provide lateral adjustment of the paddle portion relative to the bar clamp, wherein the lateral adjustment, rotational adjustment, and actuation of the actuation cable operate independent of one another, wherein the rotational adjustment pin travels within, and is confined by, the adjustment cavity, thereby limiting rotation of the paddle while providing infinite adjustment within the adjustment cavity.

2. The seat dropper remote device of claim 1, wherein the lateral adjustment comprises repositioning the mounting bolt to any point along a length of the mounting slot.

3. The seat dropper remote device of claim 1, wherein the rotational adjustment comprises loosening the assembly bolt, rotating the paddle portion to a desired position within a range of paddle rotation, and tightening the assembly bolt.

4. The seat dropper remote device of claim 2, wherein the mounting slot has a length of about 10 mm and the base portion can be fixed to the bar clamp at any point along the length of the mounting slot via the lateral adjustment.

5. The seat dropper remote device of claim 3, wherein the range of paddle rotation is about 45 degrees.

6. The seat dropper remote device of claim 1, wherein the paddle portion receives a cable clamp bolt configured to secure the actuation cable within the paddle portion, the cable clamp bolt positioned adjacent to, and coplanar with, the assembly bolt.

7. The seat dropper remote device of claim 1, wherein the mounting bolt is configured to provide lateral adjustment of the paddle portion, the central portion, and the mounting plate relative to the bar clamp.

\* \* \* \* \*